C. J. COLEMAN.
MEANS FOR HOLDING DIAMONDS DURING THE POLISHING OPERATION.
APPLICATION FILED JULY 20, 1912.
1,329,371.
Patented Feb. 3, 1920.
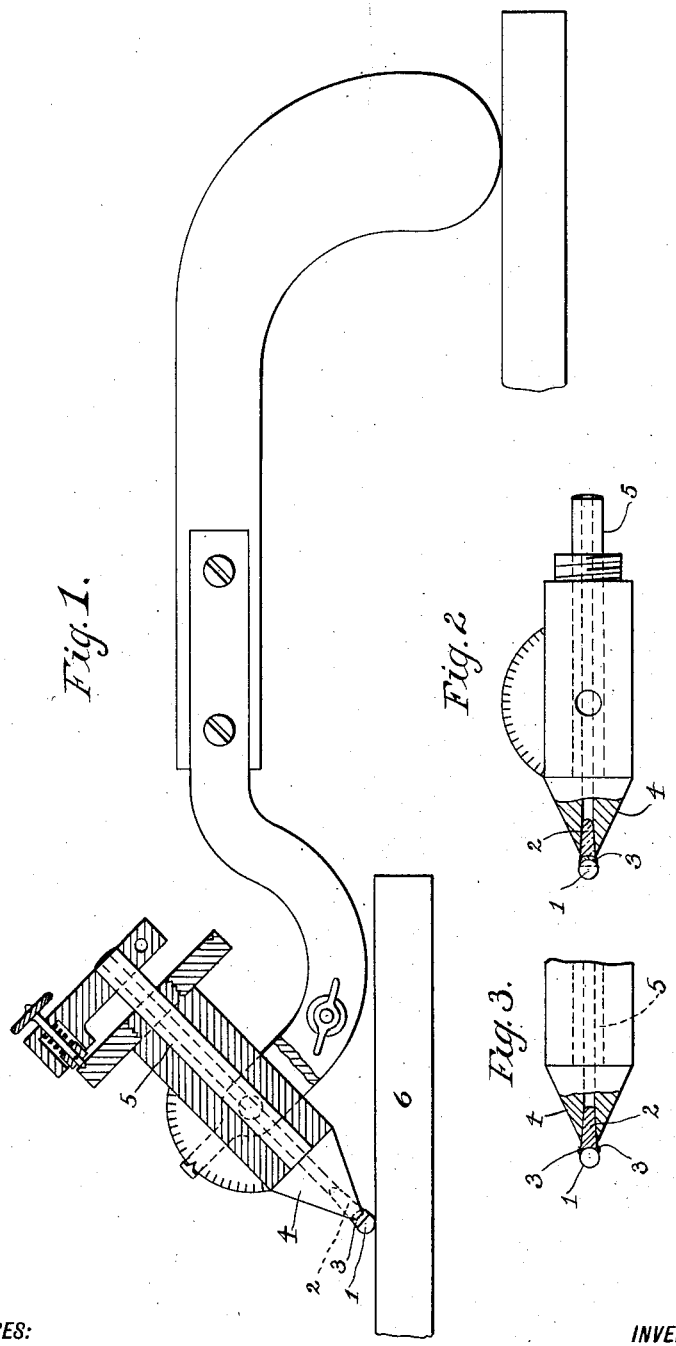

UNITED STATES PATENT OFFICE.

CLYDE J. COLEMAN, OF NEW ROCHELLE, NEW YORK, ASSIGNOR, BY MESNE ASSIGNMENTS, TO STERN-COLEMAN DIAMOND MACHINE COMPANY, INC., A CORPORATION OF NEW YORK.

MEANS FOR HOLDING DIAMONDS DURING THE POLISHING OPERATION.

1,329,371.      Specification of Letters Patent.    Patented Feb. 3, 1920.

Application filed July 20, 1912. Serial No. 710,622.

*To all whom it may concern:*

Be it known that I, CLYDE J. COLEMAN, a citizen of the United States, residing at New Rochelle, in the county of Westchester and State of New York, have invented a certain new and useful Improvement in Means for Holding Diamonds During the Polishing Operation, of which the following is a specification, reference being had therein to the accompanying drawings, forming part thereof.

My invention relates to the art of polishing diamonds, and relates more particularly to means for holding the diamond during the polishing operation. Objects of my invention are to securely hold the diamond with exposure for polishing of all parts above or below the girdle of the diamond, and to save time in attaching and in releasing the diamond from its holder, and to do away to a large extent with the skilled manipulation now necessary in diamond polishing operations. My present invention is another specific form of the invention broadly claimed in my application for patent filed on even date herewith, Serial Number 710,621. My present invention includes an arbor of a refractory material having substantially the same coefficient of expansion as the diamond holding cement and a fusible diamond-holding cement for attaching the diamond to the arbor, such cement being only fusible, however, at a temperature higher than that evolved in the diamond polishing operation. More specifically my invention includes an arbor of porcelain or the like and a cement of silicious adhesive enamel. These materials being heat resistant above the temperature produced in polishing the diamond and also having substantially the same coefficient of expansion as the diamond or sufficient elasticity or give, preclude the possibility of the diamond becoming loosened by the heat evolved in the polishing operation.

I shall now describe my invention with reference to the accompanying drawings illustrating one embodiment thereof, and shall thereafter point out my invention in claims.

Figure 1 is an elevation, partly in vertical section, of a diamond holder embodying my invention, and shows a diamond held in position for polishing upon a polishing lap.

Fig. 2 is a side view of the holder head, partly in central section, illustrating one stage of attaching the diamond to the holding arbor.

Fig. 3 is a similar view, with parts omitted, illustrating the completion of the cementing operation.

The diamond 1 has previously been roughed out or bruted to a substantially regular rounded form. The arbor 2 may be composed of porcelain, glass, quartz or other suitable material, either a clay product or of a vitreous nature. This arbor is shown as of tapered form and slightly cup shaped at its larger end, and to this cup-shaped end the diamond 1 is attached by means of a body 3 of a fusible cement. This body of cement may be composed of any suitable fusible substance which is fusible only at a higher temperature than that evolved during the diamond polishing operation, such as powdered silica (commercially known as "quartz") combined with boracic acid, or a phosphatic dental cement, or zinc oxid enamels, or a combination of a calcium oxid and borax forming a silicious cement. In Fig. 2 the diamond, cement and arbor are shown as in position ready for the cementing operation to take place. Fig. 3 illustrates the completion of the cementing operation in which the body of fusible cement and the arbor have been fused together to form a single integral mass, to the end of which the diamond 1 is adhesively attached.

During the polishing operation, as illustrated in Fig. 1, the tapered arbor 2 is contained in a slightly flaring socket in a dop head 4 provided with a tubular dop-holding stem or shank 5, through which a drift pin may be driven to loosen the arbor from its socket when it is desired to do so.

Any suitable tool for holding the dop and enabling the diamond to be pressed against the polishing lap 6 may be employed, that illustrated in Fig. 1 being a common form whose construction and operation will be readily understood without the necessity of a particular description thereof.

It is obvious that various modifications may be made in the construction shown and above particularly described within the principle and scope of my invention.

I claim:—

1. Means for holding a diamond during polishing thereof comprising an arbor, and a body of silicious cement for holding the diamond on the arbor by adhesion during the polishing operation.

2. Means for holding a diamond during polishing thereof comprising a fusible silicious cement for holding the diamond by adhesion during the polishing operation, such cement being fusible at a higher temperature than that evolved in the diamond polishing operation, and an arbor having substantially the same coefficient of expansion as the cement and to which the cement is attached by adhesion to hold the diamond on the arbor.

3. Means for holding a diamond during polishing thereof comprising a silicious cement for holding the diamond, and a porcelain arbor to which the cement is fused to hold the diamond on the arbor.

4. Means for holding a diamond during polishing thereof comprising a porcelain arbor, and an adhesive enamel interposed between the diamond and arbor for adhesively holding the diamond to the arbor.

5. Means for holding a diamond during polishing thereof comprising a fusible silicious cement for holding the diamond, such cement being fusible at a higher temperature than that evolved in the diamond polishing operation, and an arbor having resistance to heat above that evolved in diamond polishing and to which the cement is attached by adhesion to hold the diamond on the arbor.

In testimony whereof I have affixed my signature in presence of two witnesses.

CLYDE J. COLEMAN.

Witnesses:
WM. ASHLEY KELLY,
VICTOR D. BAIST.